US 12,540,389 B2
(12) United States Patent
Kimtee et al.

(10) Patent No.: US 12,540,389 B2
(45) Date of Patent: Feb. 3, 2026

(54) TEMPERATURE CONTROL SYSTEM FOR LIQUID SOURCES

(71) Applicant: ASM IP Holding B.V., Almere (NL)

(72) Inventors: Ankit Kimtee, Phoenix, AZ (US); Pawan Sharma, Tempe, AZ (US); Sudhanshu Biyani, Tempe, AZ (US)

(73) Assignee: ASM IP Holding B.V., Almere (NL)

( * ) Notice: Subject to any disclaimer, the term of this patent is extended or adjusted under 35 U.S.C. 154(b) by 436 days.

(21) Appl. No.: 18/117,514

(22) Filed: Mar. 6, 2023

(65) Prior Publication Data

US 2023/0287565 A1 Sep. 14, 2023

Related U.S. Application Data

(60) Provisional application No. 63/318,032, filed on Mar. 9, 2022.

(51) Int. Cl.
*C23C 16/448* (2006.01)
*C23C 16/52* (2006.01)
*H01L 21/67* (2006.01)
*H05B 3/28* (2006.01)

(52) U.S. Cl.
CPC ............ *C23C 16/448* (2013.01); *C23C 16/52* (2013.01); *F25B 2321/023* (2013.01); *H01L 21/67248* (2013.01); *H05B 3/28* (2013.01)

(58) Field of Classification Search
CPC . C23C 16/448; C23C 16/52; F25B 2321/023; H01L 21/67248; H05B 3/28
USPC ................................................ 261/130, 131
See application file for complete search history.

(56) References Cited

U.S. PATENT DOCUMENTS

| | | | | |
|---|---|---|---|---|
| 5,078,922 A | * | 1/1992 | Collins | .................. B01F 23/12 |
| | | | | 261/153 |
| 6,135,433 A | * | 10/2000 | Nurmi | .................. C23C 16/448 |
| | | | | 261/138 |
| 8,136,797 B2 | | 3/2012 | Duesel, Jr. | |
| 9,914,997 B2 | * | 3/2018 | Koller | .................. C23C 16/18 |
| 11,180,384 B1 | | 11/2021 | Moujdin | |
| 2011/0081686 A1 | | 4/2011 | Manthorpe | |
| 2015/0246329 A1 | * | 9/2015 | Itonaga | ............. H01L 21/67017 |
| | | | | 261/131 |

(Continued)

FOREIGN PATENT DOCUMENTS

| | | |
|---|---|---|
| CN | 107331425 B | 7/2018 |
| CN | 107564593 B | 6/2019 |
| EP | 0855215 A2 | 7/1998 |

(Continued)

*Primary Examiner* — Charles S Bushey
(74) *Attorney, Agent, or Firm* — Snell & Wilmer L.L.P.

(57) ABSTRACT

A reactor system for use in semiconductor processing that makes use of a liquid source for deposition that needs to be maintained within a specific temperature control band or range. The reactor system includes a temperature control system that includes a heating and cooling apparatus for providing both heating and cooling of a vessel that stores the liquid source to maintain the liquid source within a desired temperature control band or range. In this manner, the heating and cooling apparatus may be used in a reactor system in which the vessel needs to be cooled, needs to be heated, or uses concurrent or alternating heating and cooling to provide enhanced control of the source temperature within a particular temperature control band.

14 Claims, 4 Drawing Sheets

(56) References Cited

U.S. PATENT DOCUMENTS

2020/0408425 A1  12/2020  Zchori
2021/0123009 A1   4/2021  Yeo

FOREIGN PATENT DOCUMENTS

| JP | 2524921 B2 | | 8/1996 |
|----|------------|---|--------|
| JP | 2003156498 A | | 5/2003 |
| JP | 2006150249 A | | 6/2006 |
| KR | 20090003510 A | | 1/2009 |
| WO | WO 98/39099 | * | 9/1998 |
| WO | 2007138302 A1 | | 12/2007 |
| WO | 2016197807 A1 | | 12/2016 |

* cited by examiner

TEMPERATURE CONTROL SYSTEM FOR LIQUID SOURCES

CROSS-REFERENCE TO RELATED APPLICATIONS

This application is a nonprovisional of, and claims priority to and the benefit of, U.S. Provisional Patent Application No. 63/318,032, filed Mar. 9, 2022 and entitled "TEMPERATURE CONTROL SYSTEM FOR LIQUID SOURCES," which is hereby incorporated by reference herein.

FIELD OF THE DISCLOSURE

The present disclosure relates generally to methods and systems for controlling temperatures of a liquid source in a semiconductor processing or reactor system during deposition on wafers, and, more particularly, to methods and apparatus for controlling temperatures of a liquid source vessel using unified hardware for heating, cooling, and/or heating and cooling sources.

BACKGROUND OF THE DISCLOSURE

Various semiconductor processing methods may be used to form thin films of materials on substrates, such as silicon wafers. In some processing methods, for example, gaseous molecules of the material to be deposited are supplied to substrates to form a thin film of that material on the substrates by chemical reaction. Such formed thin films may be polycrystalline, amorphous, or epitaxial. Typically, semiconductor processing is conducted at elevated temperatures to accelerate the chemical reaction and to produce high quality films, and deposition materials (e.g., precursors, reactants, and the like) may be provided to a reaction chamber via a showerhead or the like via a liquid source that is maintained at temperatures within a carefully monitored and often relatively small temperature control range or band.

Some sources, such as those used as liquid sources for a reaction chamber, have to be controlled within differing temperature control ranges based on the nature of the chemistry of the semiconductor process. For example, some sources may need to be cooled below room temperature while other sources may need to be heated to a temperature well above room temperatures such as to over 100° C. Conventional semiconductor manufacturing systems typically employ two different sets of hardware to provide such temperature control over a liquid source. Particularly, one set of hardware is implemented when a source is be cooled below room temperature, and a second set of hardware is implemented when the source is to be heated above room temperature. When the reactor system is to have its operations switched between such operating ranges, the reactor system has to be modified to change out the cooling or heating hardware, which can lead to undesirable delays in processing and to additional work efforts and associated costs.

SUMMARY OF THE DISCLOSURE

This summary is provided to introduce a selection of concepts in a simplified form. These concepts are described in further detail in the detailed description of example embodiments of the disclosure below. This summary is not intended to identify key features or essential features of the claimed subject matter, nor is it intended to be used to limit the scope of the claimed subject matter.

Disclosed herein, according to various embodiments, is a reactor system for use in semiconductor processing that makes use of a source for deposition (e.g., reactant, precursor, and other materials) that needs to be maintained within a specific temperature control band or range. The source is provided in many cases using a storage vessel, which may hold or contain a liquid source. Particularly, the reactor system includes a temperature control system that includes a heating and cooling apparatus (or unified apparatus) for providing both heating and cooling of the storage vessel to retain the source (e.g., a liquid source) within a desired temperature control band or range that may fall within the larger range of a temperature below room temperature up to 100° C. or higher. In this manner, the heating and cooling apparatus may be used in a reactor system in which the vessel needs to be cooled, needs to be heated, or uses concurrent or alternating heating and cooling to provide enhanced control of the source temperature within a particular temperature control band.

In some exemplary embodiments, a reactor system is provided that is adapted for cooling and heating a liquid source. The system includes a reaction chamber and a vessel, fluidically coupled to the reaction chamber, that includes an interior space configured to hold a volume of the liquid source. Further, the system includes a temperature control system that includes: (a) a temperature sensor positioned within the interior space and configured to measure a temperature of the liquid source; (b) a cooling assembly that includes a first body with a surface abutting an outer surface of a sidewall of the vessel and a cooling mechanism operable to cool the first body; (c) a heating assembly that includes a second body with a surface abutting the outer surface of the sidewall of the vessel and a heating mechanism operable to heat the second body; and (d) a controller configured to generate control signals to operate at least one of the cooling assembly and the heating assembly to selectively cool or heat the vessel according to the measured temperature of the liquid source.

In some exemplary embodiments of the reactor system, the controller is configured to generate the control signals to maintain the temperature within a temperature control range. The control signals can be generated to concurrently or sequentially operate both the cooling assembly and the heating assembly to both heat and cool the vessel to maintain the temperature within the temperature control range.

In the same or other embodiments of the system, the first body and the second body are both formed of metal and are coupled together to be in abutting contact. Further, the surfaces of the first and second bodies of the cooling and the heating assemblies can be designed to define a cylindrical collar for receiving the vessel. A connector assembly may be provided for connecting the first body of the cooling assembly to the second body of the heating assembly such that an inner diameter of the cylindrical collar is adjustable. In some particular implementations, the cooling mechanism includes a thermoelectric module and the heating mechanism includes a plurality of heating elements embedded within the body of the heating assembly.

In other exemplary embodiments of the description, a method is provided for controlling a temperature of a liquid source in a reactor system. The method includes providing the liquid source in a vessel fluidically coupled to a reaction chamber, where the vessel has a sidewall with an outer surface contacting both a cooling assembly and a heating assembly. The method also includes sensing a temperature of the liquid source and processing the sensed temperature according to a temperature control band. The method can then include, based on the processing, operating at least one of the cooling assembly and the heating assembly to maintain the temperature of the liquid source within the temperature control band.

In some examples of the method, operating the cooling assembly includes extracting heat from the vessel and operating the heating assembly includes adding heat to the vessel. Then, the operating step may involve concurrently or sequentially operating both the cooling assembly and the heating assembly to maintain the temperature of the liquid source within the temperature control band. Further, the cooling assembly and the heating assembly can include first and second bodies, respectively, each with a semi-cylindrical shaped inner surface, and the first and second bodies can be positioned in abutting contact with the inner surfaces facing each other to define an inner space for receiving the vessel. Additionally, the cooling assembly can include a thermoelectric module that cools the first body during the operating step to extract heat from the vessel, and the heating assembly can include one or more heating elements embedded in the second body that heat the second body during the operating step to add heat to the vessel.

According to some embodiments of the description, an apparatus (e.g., unitary hardware) is described that is adapted to receive a vessel. The apparatus can include a cooling assembly that includes: (a) a first body including a semi-cylindrical shaped surface for contacting an outer surface of a sidewall of the vessel, where the first body is formed of metal; and (b) a cooling mechanism operable to cool the first body. Further, the apparatus can include a heating assembly that includes: (a) a second body, abutting the first body, that includes a semi-cylindrical shaped surface for contacting the outer surface of the sidewall of the vessel, where the second body is formed of metal; and (b) a heating mechanism operable to heat the second body.

In implementations of the apparatus, the surfaces of the first body and the second body can define a cylindrical collar for receiving the vessel. The apparatus may also include an adjustable fastener configured to secure the second body relative to the first body in a first position and in a second position. In some cases, the cooling mechanism includes a thermoelectric module abutting the first body and the heating mechanism includes a plurality of heating elements embedded within the second body. To facilitate efficient conductive heat transfer, the first body and the second body can be both formed of aluminum or steel.

All of these embodiments are intended to be within the scope of the disclosure. These and other embodiments will become readily apparent to those skilled in the art from the following detailed description of certain embodiments having reference to the attached figures, the disclosure not being limited to any particular embodiment(s) discussed.

BRIEF DESCRIPTION OF THE DRAWING FIGURES

While the specification concludes with claims particularly pointing out and distinctly claiming what are regarded as embodiments of the disclosure, the advantages of embodiments of the disclosure may be more readily ascertained from the description of certain examples of the embodiments of the disclosure when read in conjunction with the accompanying drawings. Elements with the like element numbering throughout the figures are intended to be the same.

DETAILED DESCRIPTION

Figure 1:
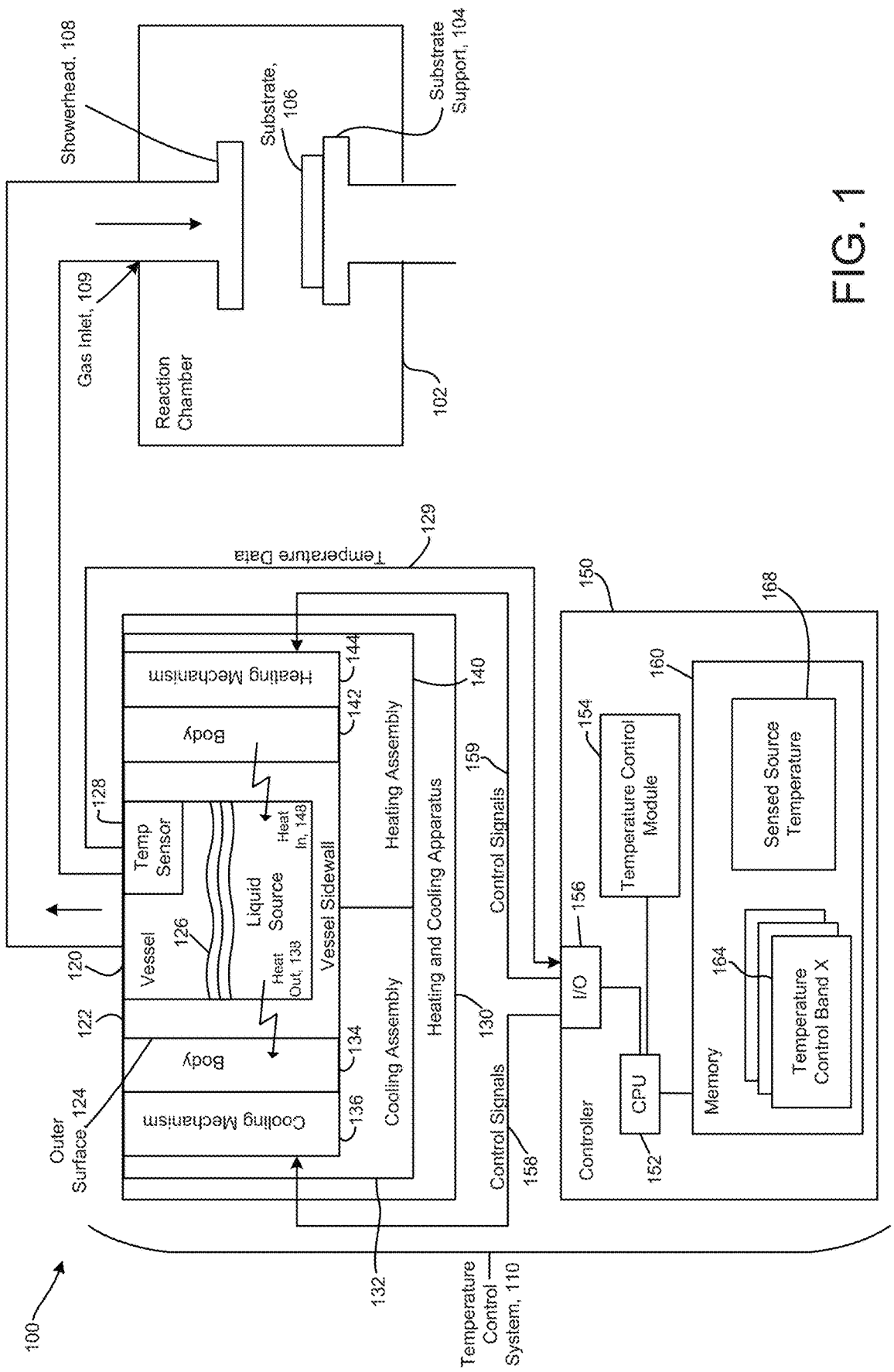
FIG. 1 is a functional block diagram of a reactor system that includes a temperature control system of the present description operable to control temperatures of a liquid source in a vessel.

Although certain embodiments and examples are disclosed below, it will be understood by those in the art that the disclosure extends beyond the specifically disclosed embodiments and/or uses of the disclosure and obvious modifications and equivalents thereof. Thus, it is intended that the scope of the disclosure should not be limited by the particular embodiments described herein.

The illustrations presented herein are not meant to be actual views of any particular material, apparatus, structure, or device, but are merely representations that are used to describe embodiments of the disclosure.

As used herein, the terms "wafer" and "substrate" may be used interchangeably to refer to any underlying material or materials that may be used, or upon which, a device, a circuit, or a film may be formed.

As used herein, the term "chemical vapor deposition" (CVD) may refer to any process wherein a substrate is exposed to one or more volatile precursors, which react and/or decompose on a substrate surface to produce a desired deposition.

As used herein, the term "atomic layer deposition" (ALD) may refer to a vapor deposition process in which deposition cycles, preferably a plurality of consecutive deposition cycles, are conducted in a process chamber. Typically, during each cycle the precursor is chemisorbed to a deposition surface (e.g., a substrate surface or a previously deposited underlying surface such as material from a previous ALD cycle), forming a monolayer or sub-monolayer that does not readily react with additional precursor (i.e., a self-limiting reaction). Thereafter, if necessary, a reactant (e.g., another precursor or reaction gas) may subsequently be introduced into the process chamber for use in converting the chemisorbed precursor to the desired material on the deposition surface. Typically, this reactant is capable of further reaction with the precursor. Further, purging steps may also be utilized during each cycle to remove excess precursor from the process chamber and/or remove excess reactant and/or reaction byproducts from the process chamber after conversion of the chemisorbed precursor. Further, the term "atomic layer deposition," as used herein, is also meant to include processes designated by related terms such as, "chemical vapor atomic layer deposition", "atomic layer epitaxy" (ALE), molecular beam epitaxy (MBE), gas source MBE, or organometallic MBE, and chemical beam epitaxy when performed with alternating pulses of precursor composition(s), reactive gas, and purge (e.g., inert carrier) gas.

As described in greater detail below, various details and embodiments of the disclosure may be utilized in conjunction with a reaction chamber configured for a multitude of deposition processes, including but not limited to, ALD, CVD, metalorganic chemical vapor deposition (MOCVD), and MBE, physical vapor deposition (PVD). The embodiments of the disclosure may also be utilized in semiconductor processing systems configured for processing a substrate with a reactive precursor, which may also include etch processes, such as, for example, reactive ion etching (ME), capacitively coupled plasma etching (CCP), and electron cyclotron resonance etching (ECR).

Monitoring and controlling the temperature of a source (such as a liquid source) used for supplying deposition materials (e.g., reactants, precursors, and so on) to a reaction chamber is useful and, often, important during deposition processes (e.g., CVD, ALD, and other processes used to form thin films on wafers). Based on the nature of the deposition chemistry, that source may need to be cooled below room temperature or be heated up to a 100° C. or higher.

To this end, unified hardware in the form of a two-part or sectional heating and cooling apparatus as created to allow a single set of hardware to be used to accomplish large temperature control ranges or bands for a vessel by providing cooling, heating, or both to control vessel temperatures and, as a result, temperatures of sources contained within such vessels. A finer resolution of temperature control of the source vessel is enabled, too, due to the ability to provide both cooling and heating. Additionally, the new heating and cooling apparatus allows tool matching without requiring changing out the cooler or heater and eliminates the effect of differences in ambient temperature on vessel temperatures.

In brief, the heating and cooling apparatus includes a sectional or two-part mantle or collar in which a vessel is placed, and one section or part of the mantle or collar is operable to extract heat while the second section or part of the mantle or collar is operable to add or provide heat from the sidewalls of the vessel. With this dual heating and cooling function, a temperature control system that includes the new heating and cooling apparatus can be used to: (a) provide precise temperature control of vessels to a much tighter temperature band with less overshoot of temperatures; (b) eliminate effects of ambient temperatures on vessel temperatures when operating close to room temperature; (c) reduce number of hardware configurations needed for reactor systems; and (d) provide an increased capability to use a source cabinet for other purposes than temperature control.

FIG. 1 illustrates a reactor system 100 adapted for providing improved temperature control over a vessel and a source stored within the vessel through the use of unified heating and cooling hardware. The system 100 includes a reaction chamber 102, a storage vessel 120 storing a liquid source 126, and a temperature control system 110 for monitoring and controlling the temperature of the liquid source 126. During operations, deposition materials are provided using the source 126 via a gas inlet 109 to the chamber 102 that provides materials to a showerhead/distribution device 108. A substrate support or susceptor 104 is provided in the reaction chamber 102 below the showerhead 108, and a wafer 106 is positioned upon the support 104 during operations of the system 100, e.g., to form a thin film or the like on the wafer 106 via CVD or other deposition processes known to the semiconductor industry.

The vessel 120 includes an outer sidewall(s) 122, which may be formed of a metal such as aluminum, steel, or the like that is suited for efficient conductive heat transfer as well as providing strength demanded for a pressure vessel to contain the liquid source 126 under raised temperatures and/or pressures. The temperature control system 110 includes a temperature sensor 128 (e.g., one or more thermocouples or the like) that may be positioned in or on the vessel 120 to sense the temperature of the liquid source 126 during operations of the system 100. The sensor 128 provides signals (or collected temperature data) 129 to a controller 150 of the temperature control system 100 such as via wired or wireless signals received by the input/output (I/O) components 156 of the controller 150.

To provide improved control of the liquid source temperature, the temperature control system 110 includes a heating and cooling apparatus 130, which is operable in response to control signals 158 and 159 from the controller 150 to provide heating and cooling in a separate fashion or in a concurrent and/or alternating manner. Particularly, the heating and cooling apparatus 130 may be considered sectional or a two-part construction with one section or part providing cooling and one section or part providing heating, and these sections/parts may be independently operated to provide only cooling or only heating or operated in a coordinated manner such as concurrently or sequentially to provide both cooling and heating during an operation of the system 100.

As shown, the apparatus 130 includes a cooling assembly 132 and a heating assembly 140. Each includes a body 134 or 142 that is placed in abutting contact with an outer surface 122 of the vessel sidewall 122 to facilitate efficient heat transfer. Particularly, during operations of the cooling assembly 130, heat as shown with arrow 138 is extracted or removed from the vessel 120 (and, hence, source 126) via the vessel sidewall 122, and, during operations of the heating assembly 140, heat as shown with arrow 148 is added or provided to the vessel (and, hence, source 126) via the vessel sidewall 122.

The bodies 134, 142 may be formed of a material that readily conducts heat such as a metal—aluminum may be preferred in some cases while other embodiments utilize a steel. The bodies 134, 142 may take a variety of shapes to provide relatively large contact or heat transfer areas between the bodies 134, 142 and the surface 124 such as bodies with arcuate or planar inner surface for mating with surface 122. Often, the vessel 120 will be provided as a cylindrical sidewall. In such embodiments, the bodies 134 and 142 may be semi-cylindrical in shape with inner diameters matching or somewhat larger than an outer diameter of the vessel sidewall 122 to facilitate the bodies 134, 142 receiving and physically mating with the sidewall outer surface 124.

In some cases, each body 134, 142 forms a longitudinal section (e.g., about half) of a cylinder such that each body 134, 142 extends along a length or height of the vessel sidewall 122 to enclose the vessel 120 in a heat transfer mantle or collar. While not shown, such an embodiment provides a pair of surfaces in each body 134, 142 that contact the other body 134, 142 when the bodies are mated together, and these surfaces provide heat transfer surfaces that allow heat to be conductively transferred between the bodies 134, 142. Hence, when the cooling assembly 132 is operated, heat is extracted from the heating assembly body 142 by the body 134 of the cooling assembly 132, and, when the heating assembly 140 is operated, heat is added from the heating assembly body 142 to the body 134 of the cooling assembly 132. In this manner, the vessel 120 is more evenly cooled or heated about the entire perimeter (typically, a circumference) of the vessel sidewall 122.

To remove heat 138 from the vessel 120, the cooling assembly 132 includes a cooling mechanism 136 that cools the body 134 to a temperature below that of the sidewall 122. The cooling mechanism 136 may take a number of forms to implement the system 100. In one example, the cooling mechanism 136 takes the form of a thermoelectric cooling device (e.g., one using the Peltier effect to achieve cooling) being useful in many situations. In such exemplary implementations, the cooling side or element of the thermoelectric or Peltier cooling device or module being placed in abutting contact with the body 134 so as to cool the body 134.

To add heat 148 to the vessel 120, the heating assembly 140 includes a heating mechanism 144 that heats the body 142 to a temperature greater than that of the vessel sidewall 120. The heating mechanism 144 may take a variety of forms such as a heating pads, a set of resistance heating rods or elements, a liquid heat exchanger, and the like, and the heating mechanism 144 may be external to the body 142, such with components contacting outer surfaces of the body as discussed for the body 134 of the cooling assembly 132, and/or may be internal to the body 142, such as with heating elements or rods, tubing for heated fluids, and so on extending through the body 142 to raise the temperature of the body 142.

The temperature control system 110 further includes the controller 150 to process temperature data 129 from the sensor(s) 128 and, in response, to generate control signals 158, 159 to concurrently or separately operate the cooling assembly 132 and the heating assembly 140 to extract heat 138 and/or add heat 148 to the vessel 120. To this end, the controller 150 may take the form of nearly any electronic or computing device with a processor 152 managing operations of the I/O devices 156 to communicate (in a wired or wireless manner) with the cooling mechanism 136 with control signals 158, with the heating mechanism 144 with control signals 159, and with the temperature sensor(s) 128 via signals 129.

Further, the processor 152 executes code or instructions (or software stored in memory 160 to provide the functions of a temperature control module 154. Memory 160 is provided on (or accessible to but remote) the controller 150, and the processor 152 manages access to this memory 160 including the storage of one or more temperature control bands or ranges 164 for use during various operations of the reactor system 100. For example, some temperature control bands 164 may call for a temperature control range that is at or some amount below or above room temperature while others may call for a temperature control range that is above room temperature, such as a range falling between 50 and 100° C., a range falling between 75 and 100° C., or a range above 100° C.

Heating and/or cooling may be useful in maintaining the temperature of the liquid source 126 within such temperature control bands 164. With that in mind, the temperature control module 154 can be configured to compare a sensed source temperature 168 from the received temperature data 129 from the sensor 128 to the presently-used control band 164. Based on this comparison, the temperature control module 154 may determine that the temperature 168 is: (a) out of the band low and respond by generating a control signal 159 to cause the heating mechanism 144 to operate to add heat 148 to the vessel 120; (b) out of the band high and respond by generating a control signal 158 to cause the cooling mechanism 136 to operate to cool the body 134 and extract heat 138 from the vessel 120; and (c) within the band such that no heat has to be removed or added or such that heat can continue to be added or extracted (e.g., when at a low end of the band or at a high end of the band, respectively). With very tight temperature control bands 164 (e.g., ranges of 10 degrees or less, 5 degrees or less, 2 degrees or less, and so on between maximum and minimum), the cooling mechanism 136 and the heating mechanism 144 can be concurrently operated to varying degrees or in an alternating or sequential manner to provide precise controls of the sensed source temperature 168.

Figure 2:
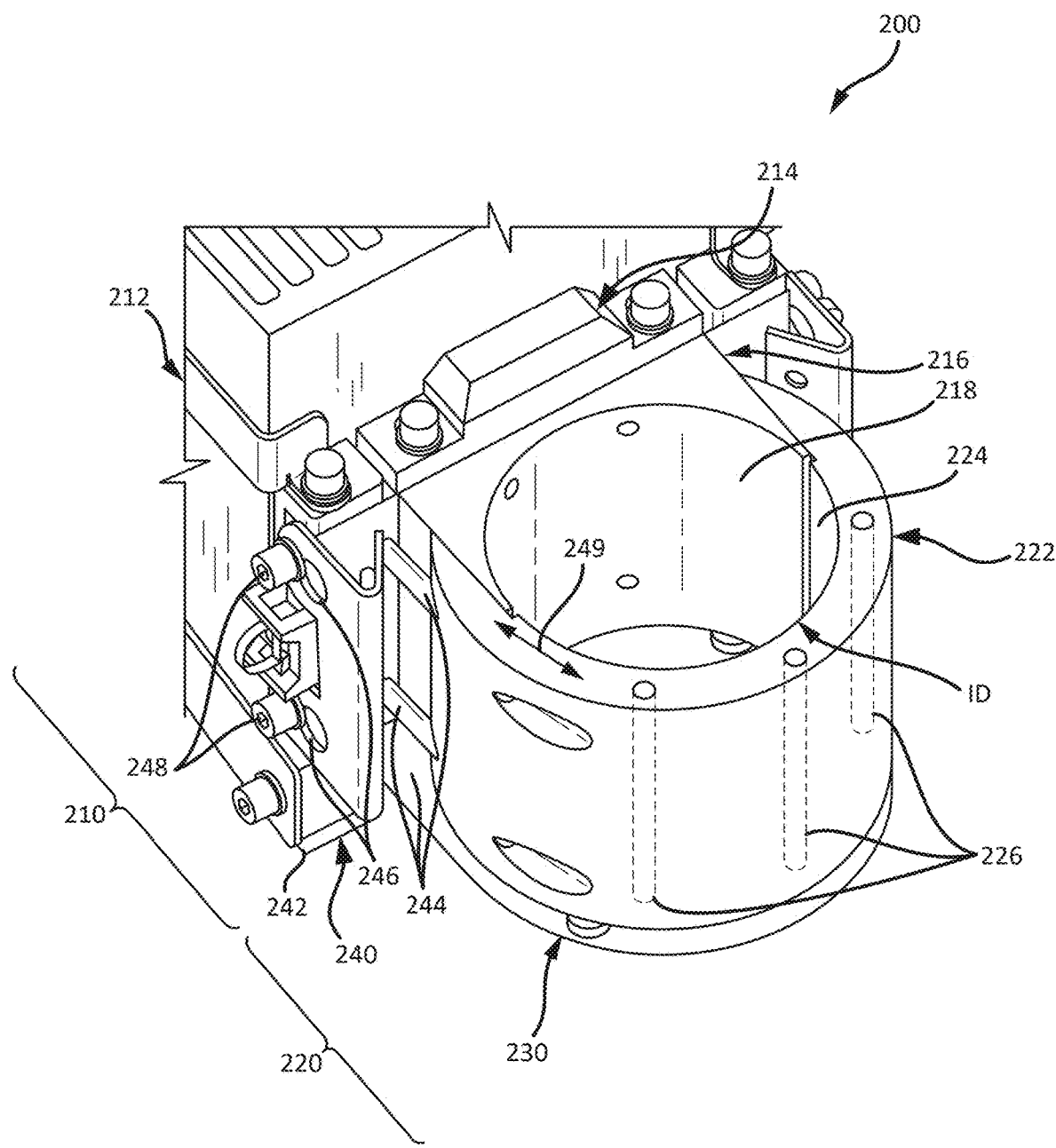
FIG. 2 illustrates a top perspective view of a heating and cooling apparatus according to the present description such as for use in the temperature control system of FIG. 1.

FIG. 2 illustrates a top perspective view of a sectional heating and cooling apparatus 200 according to the present description such as for use in the temperature control system 110 as heating and cooling apparatus 130 of FIG. 1. The apparatus 200 provides unified hardware as it can achieve both heating and cooling of a vessel (not shown but understood from FIG. 1 and vessel 120), and the apparatus 200 is sectional or a two-part construction as these two functions are provided by two interconnected and mated components or assemblies. Specifically, as shown, the apparatus 200 includes a cooling assembly 210 and a heating assembly 220 that are physically interconnected via a connector assembly 240.

The cooling assembly 210 includes a cooling mechanism 212 that may take the form of a Peltier cooler and heat exchanger assembly or module, which is operable (e.g., in response to control signals from a controller as shown with reference to FIG. 1) when supplied with electricity to cool or extract heat from cooling element 214. The cooling assembly 210 also includes a body 216, which may be formed of aluminum or another metal, that has an outer surface abutting the cooling element 214 to facilitate conductive heat transfer away from the body 216. The body 216 includes an inner (or heat transfer or contact) surface 218 that is shaped and sized to mate with a storage vessel (for a liquid source or the like) received within the apparatus 200.

As discussed with reference to FIG. 1, the vessel typically will be cylindrical in shape and, hence, the inner surface 218 of the body 216 is typically smooth and may be arcuate or semi-cylindrical in shape with a radius matching or a small amount larger than a vessel to be cooled by the cooling assembly 210. The surface 218 is "semi" cylindrical in that it may define half or another portion or section of a cylinder (e.g., extend about half or some other portion of the circumference of a received vessel) that is completed by the inner surface 224 of the body 222 of the heating assembly 220 as shown in FIG. 2. The surface 210 typically also would have a height that extends from a base/platform 230 of the apparatus 200, which is used to vertically support a received vessel and to retain the vessel in place against the surface 218, to a height matching a height of a vessel sidewall (or in the range of 80 to 100 percent or more of the vessel height).

The heating assembly 220 includes a body 222 with an inner (or contact or heat transfer) surface 224 that is arcuate in shape similar to the surface 218. The surface 224 may be semi-cylindrical in shape with a radius matching or some amount larger than the outer diameter of a vessel to be received in the apparatus 200. As with the body 216 of the cooling assembly 210, the body 222 of the heating assembly 220 is sectional or "semi" cylindrical in that its inner surface 224 makes up a half or other portion of a cylinder that is completed by the addition of the inner surface 216 of the cooling assembly body 216. The inner surface 224 and body 222 typically will be smooth to facilitate heat transfer and have a height matching that of the vessel's sidewall (or some percentage of this height as discussed for inner surface 218). The body 222 may be formed of a metal such as aluminum, steel, or the like that is the same or different from the body 216.

The heating assembly 220 also includes heating elements 226, which in this non-limiting example, include a plurality of heat rods 226 embedded within the body 222 and extending generally from the top to the bottom of the body 222. Other embodiments may utilize heat coils, fluid heat transfer tubing, and the like, and any of these heating mechanisms, including heating pads or jackets, may be embedded or provided on an exterior surface of the body 222. As discussed with reference to FIG. 1, the heating elements 226 are operable in response to control signals from a controller to selectively heat the body 222 to increase the temperature of the body 222 and inner surface 224 to cause heat to be added to a vessel in the cylindrical inner space defined by the inner surfaces 218 and 224 of the two bodies 216 and 222. As shown, it will be understood that the two bodies 216 and 222 mate along a pair of sides or edges such that heat transfer occurs between the bodies 216 and 222 and the mantle or collar formed by interconnecting the two bodies 216 and 222 is cooled or heated so as to extract or add heat along the inner surface of the collar or mantle made up of both inner surfaces 218 and 224.

To form a heat transfer collar or mantle, the two bodies 216 and 222 are physically held together in mating or abutting contact as shown in FIG. 2. To this end, the apparatus 200 includes the connector assembly 240. During assembly of the apparatus, a vessel may be placed on the base or platform 230 with its sidewall against the inner surface 218 of the body 216 of the cooling assembly 210. Then, the body 222 of the heating assembly 220 can be moved inward or toward the body 216 of the cooling assembly 210 as shown with arrows 249 so as to place the two bodies 216 and 222 in abutting contact along one edge and to place the two inner surfaces 218 and 224 in contact with an outer surface of the sidewall of the vessel (as shown in FIG. 1) to facilitate conductive heat transfer during operations of the apparatus 200. In this manner, the inner diameter (ID) of the collar or mantle formed with bodies 216 and 222 is adjustable to ensure a firm fit with a received vessel.

In some embodiments, a layer of a material 400, such as aluminum, carbon fiber thermal pad, graphite thermal pad, or the like, may be disposed between the outer surface of the vessel 120 and the bodies 216 and 222. This layer of material 400 may surround the outer surface of the vessel 120 to fill in any gaps and/or remove any air pockets that may exist between the outer surface of the vessel and the bodies 216 and 222 due to irregularities on the surface of the bodies 216 and 222 and/or the outer surface of the vessel 120.

The connector assembly 240 includes a pair of brackets 242 that are affixed via arms 244 to the body 222 of the heating assembly 220. The brackets 242 include adjustment slots or grooves 246 through which fasteners 248 are inserted and mated with the body 216 of the cooling assembly 210. During assembly, the fasteners 248 may be loosened such that the body 222 of the heating assembly 220 and the bracket(s) 242 may be slid toward or away from (as shown with arrows 249) the body 216 of the cooling assembly 210 to cause both inner surfaces 218 and 224 to contact outer surfaces of a vessel sidewall.

Figure 3:
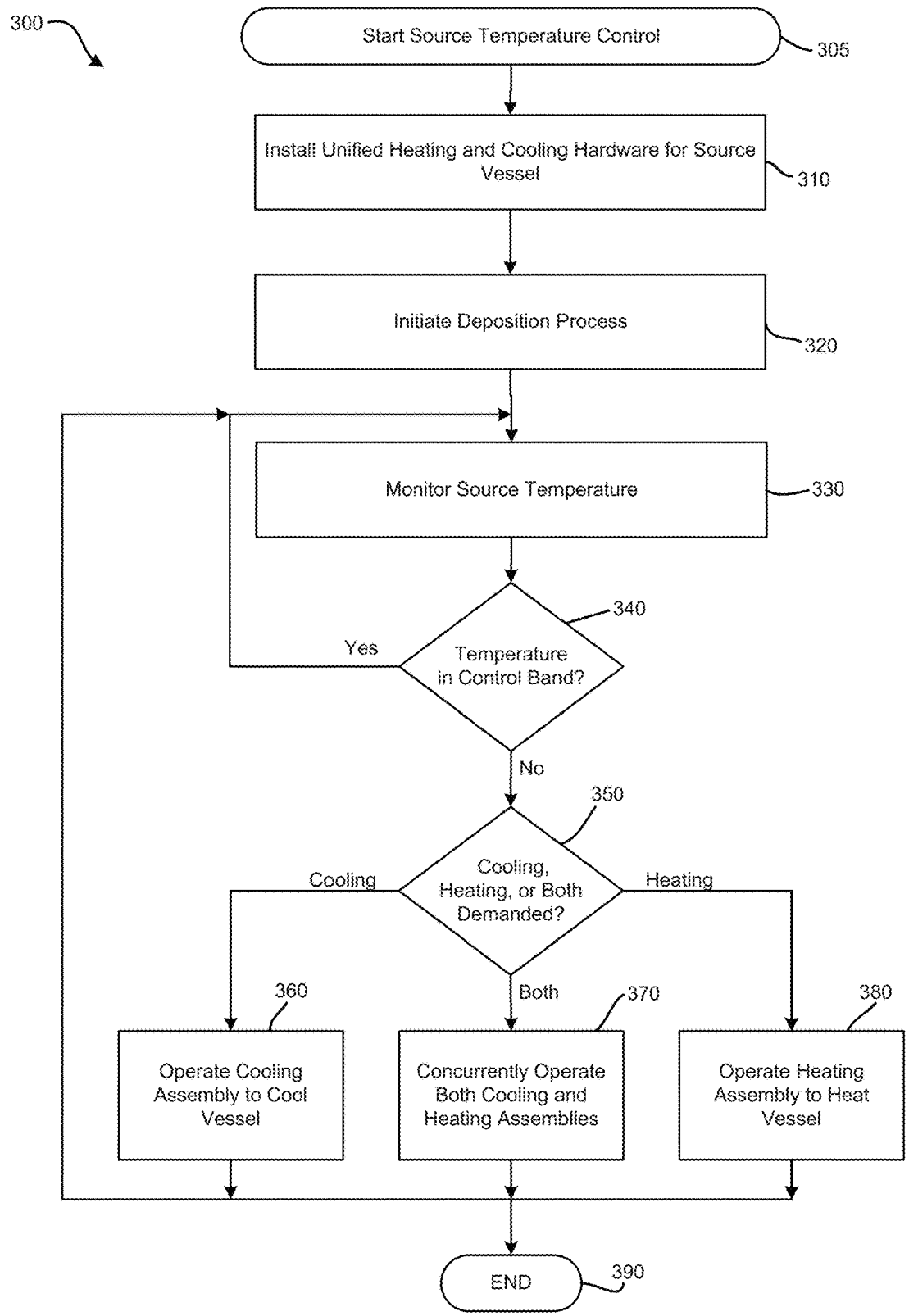
FIG. 3 illustrates a flow diagram of a method for controlling a source temperature for a reactor system that may be implemented via operation of the system of FIG. 1 or via the operation of the heating and cooling apparatus of FIG. 2.
Figure 4:
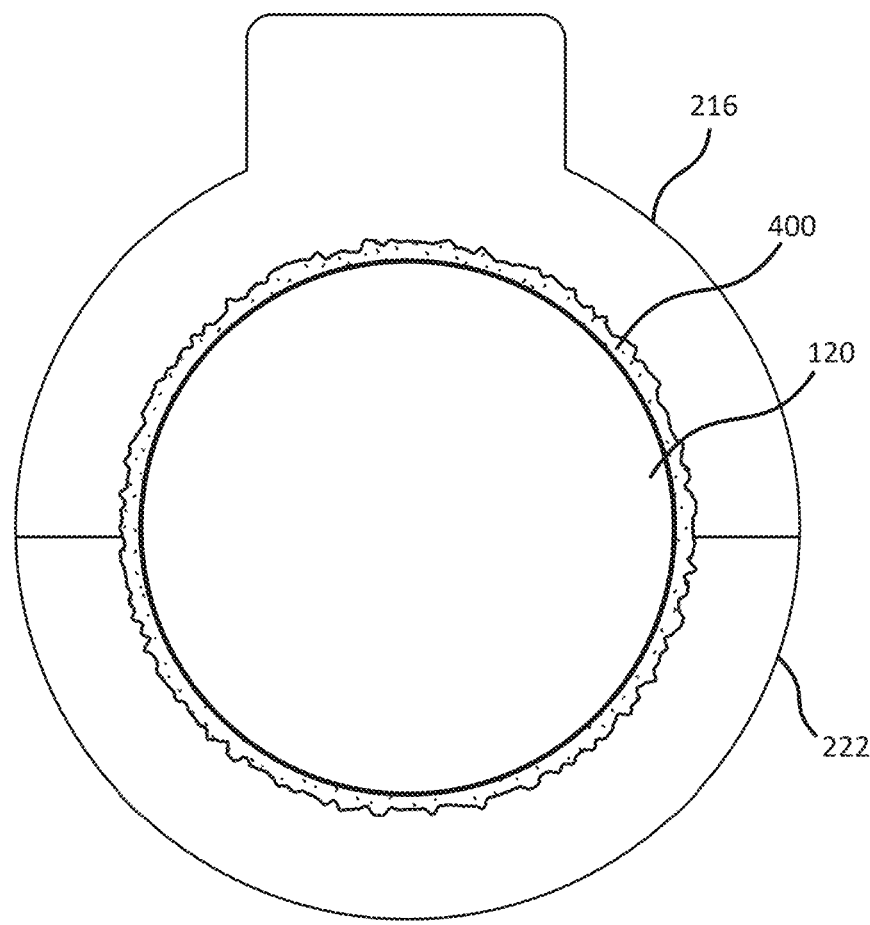
FIG. 4 illustrates a top view of a heating and cooling apparatus in accordance with an embodiment of the present technology.

FIG. 3 illustrates a flow diagram of a method 300 for controlling a source temperature for a reactor system that may be implemented via operation of the system 100 of FIG. 1 or via the operation of the heating and cooling apparatus 200 of FIG. 2. The method 300 starts with step 305, which may include defining one or more temperature control ranges for one or more processes to be carried out though operations of a reactor system. These temperature control ranges may be stored in memory within or accessible by a controller of the reactor system.

The method 300 continues at step 310 with installing unified hardware for both cooling and heating a source vessel, and this may take the form of apparatus 200 that, when assembled, forms a heat transfer collar or mantle about a received vessel (e.g., one used to maintain a liquid source at a temperature within a predefined temperature band). The method 300 next includes initiating at step 320 a deposition process to be carried out by a reactor system that includes the source vessel received within the unified hardware for heating and cooling.

At step 330, the method 300 includes monitoring the temperature of the source (e.g., liquid source) within the interior volume of the source vessel. This may be performed by one or more thermocouples that output the sensed temperature or data from which such a temperature can be determined by a processor. The method 300 continues at 340 with the processor using a temperature control module to determine whether the sensed temperature of the source is within a temperature control range in use for the present deposition process being performed by the reactor system. If within the range, the control method 300 may continue with repeating step 330. In some cases, though, heating, cooling, or both will be performed as discussed with reference to steps 360-380 even though the temperature is within the desired range such as when the temperature is approaching a lower limit or an upper limit of the range or to provide ongoing cooling or heating to retain the source in the range (e.g., continued cooling to maintain a source below room temperature).

If outside the temperature range (or otherwise based on the comparison as noted above), the method 300 continues at 350 with the processor running the temperature control module to determine whether cooling, heating, or both are desirable to maintain or adjust the source temperature. If cooling is determined to be desirable, the method 300 continues at 360 with the controller operating via control signals (or providing electricity) to the cooling assembly to cool the vessel, and this may involve operating a thermoelectric cooling module to cool the body of cooling assembly that is contacting an outer surface of the source vessel.

If heating is determined to be desirable, the method 300 continues at 380 with the controller operating via control signals (or providing electricity) to the heating assembly to heat the vessel, and this may involve using heating elements to heat the body of the heating assembly that is contacting an outer surface of the source vessel. If cooling and heating is determined useful, the controller may operate both the cooling and heating assembly to concurrently (at least partially) or in an alternating manner to both heat and cool the vessel. The method 300 may then continue with repeating step 330 involving monitoring the source temperature or may end at step 390, such as once a deposition or other process is completed by the operations of the reactor system that includes the source vessel.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

Reference throughout this specification to features, advantages, or similar language does not imply that all of the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the subject matter of the present application may be practiced without one or more of the specific features or advantages of a particular embodiment. In other instances, additional features and advantages may be recognized in certain embodiments that may not be present in all embodiments of the disclosure. Further, in some instances, well-known structures, materials, or operations are not shown or described in detail to avoid obscuring aspects of the subject matter of the present disclosure. No claim element is intended to invoke 35 U.S.C. 112(f) unless the element is expressly recited using the phrase "means for."

The scope of the disclosure is to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. Further, the term "plurality" can be defined as "at least two." As used herein, the phrase "at least one of", when used with a list of items, means different combinations of one or more of the listed items may be used and only one of the items in the list may be needed. The item may be a particular object, thing, or category. Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A, B, and C. In some cases, "at least one of item A, item B, and item C" may mean, for example, without limitation, two of item A, one of item B, and ten of item C; four of item B and seven of item C; or some other suitable combination.

All ranges and ratio limits disclosed herein may be combined. Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Any reference to attached, fixed, connected or the like may include permanent, removable, temporary, partial, full and/or any other possible attachment option. Additionally, any reference to without contact (or similar phrases) may also include reduced contact or minimal contact. In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

Although exemplary embodiments of the present disclosure are set forth herein, it should be appreciated that the disclosure is not so limited. For example, although reactor systems are described in connection with various specific configurations, the disclosure is not necessarily limited to these examples. Various modifications, variations, and enhancements of the system and method set forth herein may be made without departing from the spirit and scope of the present disclosure.

The subject matter of the present disclosure includes all novel and nonobvious combinations and subcombinations of the various systems, components, and configurations, and other features, functions, acts, and/or properties disclosed herein, as well as any and all equivalents thereof.

What is claimed is:

1. A reactor system adapted for cooling and heating a liquid source, comprising:
   a reaction chamber;
   a vessel, fluidically coupled to the reaction chamber, comprising an interior space configured to hold a volume of the liquid source; and
   a temperature control system comprising:
      a temperature sensor positioned within the interior space and configured to measure a temperature of the liquid source;
      a cooling assembly comprising a first body with a surface abutting an outer surface of a sidewall of the vessel and a cooling mechanism operable to cool the first body;
      a heating assembly comprising a second body with a surface abutting the outer surface of the sidewall of the vessel and a heating mechanism operable to heat the second body; and
      a controller configured to generate control signals to operate at least one of the cooling assembly and the heating assembly to selectively cool or heat the vessel according to the measured temperature of the liquid source.

2. The system of claim 1, wherein the controller is configured to generate the control signals to maintain the temperature within a temperature control range.

3. The system of claim 2, wherein the control signals are generated to concurrently or sequentially operate both the cooling assembly and the heating assembly to both heat and cool the vessel to maintain the temperature within the temperature control range.

4. The system of claim 1, wherein the first body and the second body are both formed of metal and are coupled together to be in abutting contact.

5. The system of claim 4, wherein the surfaces of the first and second bodies of the cooling and the heating assemblies define a cylindrical collar for receiving the vessel.

6. The system of claim 5, further comprising a connector assembly for connecting the first body of the cooling assembly to the second body of the heating assembly such that an inner diameter of the cylindrical collar is adjustable.

7. The system of claim 1, wherein the cooling mechanism comprises a thermoelectric module, and wherein the heating mechanism comprises a plurality of heating elements embedded within the second body of the heating assembly.

8. The system of claim 1, further comprising a layer of material disposed between the outer surface of the vessel and the first and second bodies, wherein the layer of material comprises aluminum.

9. A method of controlling a temperature of a liquid source in a reactor system, comprising:
providing the liquid source in a vessel fluidically coupled to a reaction chamber, wherein the vessel has a sidewall with an outer surface contacting both a cooling assembly and a heating assembly;
sensing the temperature of the liquid source;
processing the sensed temperature according to a temperature control band; and
based on the processing, operating at least one of the cooling assembly and the heating assembly to maintain the temperature of the liquid source within the temperature control band.

10. The method of claim 9, wherein operating the cooling assembly comprises extracting heat from the vessel and wherein operating the heating assembly comprises adding heat to the vessel.

11. The method of claim 9, wherein the operating step comprises concurrently or sequentially operating both the cooling assembly and the heating assembly to maintain the temperature of the liquid source within the temperature control band.

12. The method of claim 9, wherein the cooling assembly and the heating assembly include first and second bodies, respectively, each with a semi-cylindrical shaped inner surface and wherein the first and second bodies are positioned in abutting contact with the semi-cylindrical shaped inner surfaces facing each other to define an inner space for receiving the vessel.

13. The method of claim 12, wherein the cooling assembly further comprises a thermoelectric module that cools the first body during the operating step to extract heat from the vessel.

14. The method of claim 12, wherein the heating assembly further comprises one or more heating elements embedded in the second body that heat the second body during the operating step to add heat to the vessel.

* * * * *